United States Patent
Shurboff et al.

(10) Patent No.: US 8,243,155 B2
(45) Date of Patent: Aug. 14, 2012

(54) METHOD AND APPARATUS FOR ROBUST IMAGE PROCESSING

(75) Inventors: Carl L. Shurboff, Grayslake, IL (US); Fan He, Gurnee, IL (US); Joy Xiong, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1102 days.

(21) Appl. No.: 11/770,061

(22) Filed: Jun. 28, 2007

(65) Prior Publication Data

US 2009/0002529 A1 Jan. 1, 2009

(51) Int. Cl.
*H04N 5/228* (2006.01)

(52) U.S. Cl. .................................. 348/222.1

(58) Field of Classification Search .................. None
See application file for complete search history.

(56) References Cited

U.S. PATENT DOCUMENTS

| | | | | |
|---|---|---|---|---|
| 5,691,767 | A * | 11/1997 | Tahara | 375/240.01 |
| 5,761,342 | A * | 6/1998 | Yoshida | 382/234 |
| 6,825,884 | B1 * | 11/2004 | Horiuchi | 348/362 |
| 7,075,569 | B2 | 7/2006 | Niikawa | |
| 7,176,962 | B2 * | 2/2007 | Ejima | 348/208.4 |
| 2004/0041919 | A1 * | 3/2004 | Yamanaka | 348/222.1 |
| 2005/0128323 | A1 * | 6/2005 | Choi | 348/239 |
| 2005/0213836 | A1 * | 9/2005 | Hamilton | 382/251 |
| 2006/0082675 | A1 | 4/2006 | McGarvey et al. | |
| 2006/0104627 | A1 | 5/2006 | Park | |
| 2009/0169122 | A1 * | 7/2009 | He et al. | 382/238 |

FOREIGN PATENT DOCUMENTS

| | | |
|---|---|---|
| JP | 2003169255 | 6/2003 |
| JP | 20044159211 | 6/2004 |
| JP | 2005269451 | 5/2005 |

OTHER PUBLICATIONS

Mase, M., et al, "A Wide Dynamic Range CMOS Image Sensor with Multiple Exposure-Time Signal Outputs and 12-bit Column-Parallel Cyclic A/D Converters", IEEE Journal of Solid-State Circuits, vol. 40., No. 12 Dec. 2005.
Bogoni, L, et al "Image Enhancement using Pattern-Selective Color Image Fusion", Image Analysis and Processing, 1999.

(Continued)

*Primary Examiner* — Justin P Misleh

(57) ABSTRACT

A method and digital camera module is provided for taking a digital picture of an image. The digital camera module includes a plurality of light sensitive pixel elements, a first memory buffer, a second memory buffer and a controller. The controller is coupled to the plurality of light sensitive pixel elements and the first and second memory buffers and records a first plurality of pixel values representing an image by activating the plurality of light sensitive pixel elements in a first predetermined manner and stores the first plurality of pixel values in the first buffer. The controller then records a second plurality of pixel values representing the image by activating the plurality of light sensitive pixel elements in a second predetermined manner and stores the second plurality of pixel values in the second buffer. The controller further processes the first and second plurality of pixel values in a compressed domain to generate a third plurality of pixel values representative of the image.

7 Claims, 5 Drawing Sheets

OTHER PUBLICATIONS

Wang, J., et al "Unsupervised Multi-resolution Segmentation for Images with Low Depth of Field", IEEETrans. Pattern Analysis and Machine Int., vol. 23. No. 1 Jan. 2001.

Forster, B., et al "Extended DOF for Multi-Channel Microscopy Images", IEEE 2004.

Kim, C, "Segmenting a low DOF Image Using Morphological Filters and Region Merging", IEEE Trans. On Image Processing, vol. 14, No. 10, Oct. 2005.

Forster, B., et al Complex Wavelets for Extended Depth-of-Field: A New Method for Fusion of Multichannel Microscopy Images, Microscopy Research and Techniques 65:33-42 (2004).

Lodriguss, J., "Catching the Light" www.astropix.com/HTML/J_DIGIT/PS_HDR.HTM Oct. 2006.

International Search Report PCT/US2008/062360 dated Sep. 12, 2008.

* cited by examiner

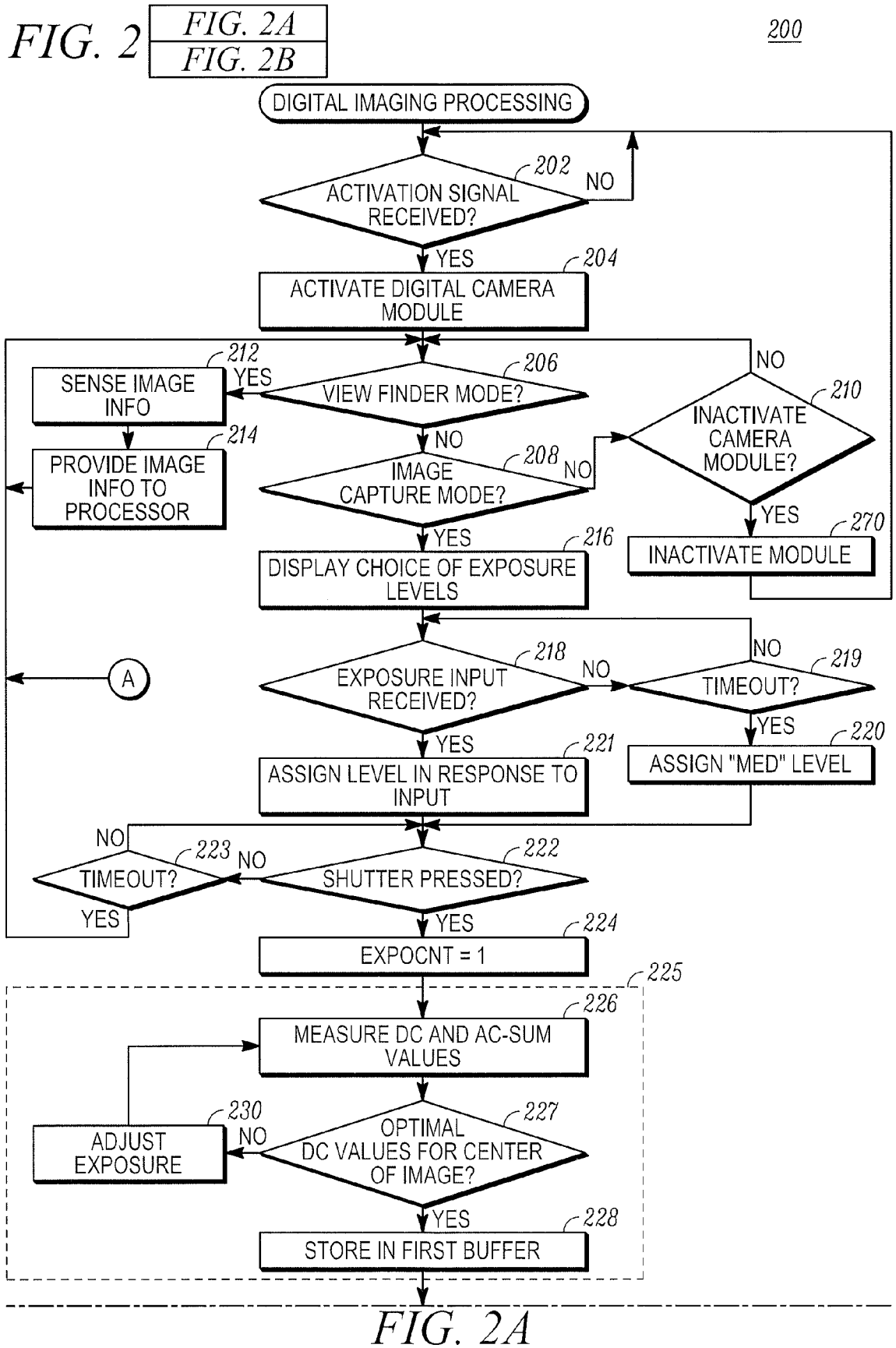

METHOD AND APPARATUS FOR ROBUST IMAGE PROCESSING

FIELD OF THE INVENTION

The present invention generally relates to digital cameras, and more particularly relates to robust imaging processing for digital cameras.

BACKGROUND OF THE DISCLOSURE

A digital camera captures and stores image information digitally representing an image seen through a lens of the digital camera. The current trend in digital cameras is to reduce the size of the cameras as well as incorporating digital cameras in other devices such as cellular telephones. As the size of the camera is reduced, the size of the camera's lens system is also reduced. A small lens system creates shading issues for the camera in that the small lens system causes a bright center of the image information with vignetting towards the corners of the image.

Thus, what is needed is a method and an apparatus for robust image processing of digital camera image data which smooths out the image information to reduce the bright centers and lighten the vignetted corners. Furthermore, other desirable features and characteristics of the present invention will become apparent from the subsequent detailed description of the invention and the appended claims, taken in conjunction with the accompanying drawings and this background of the disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
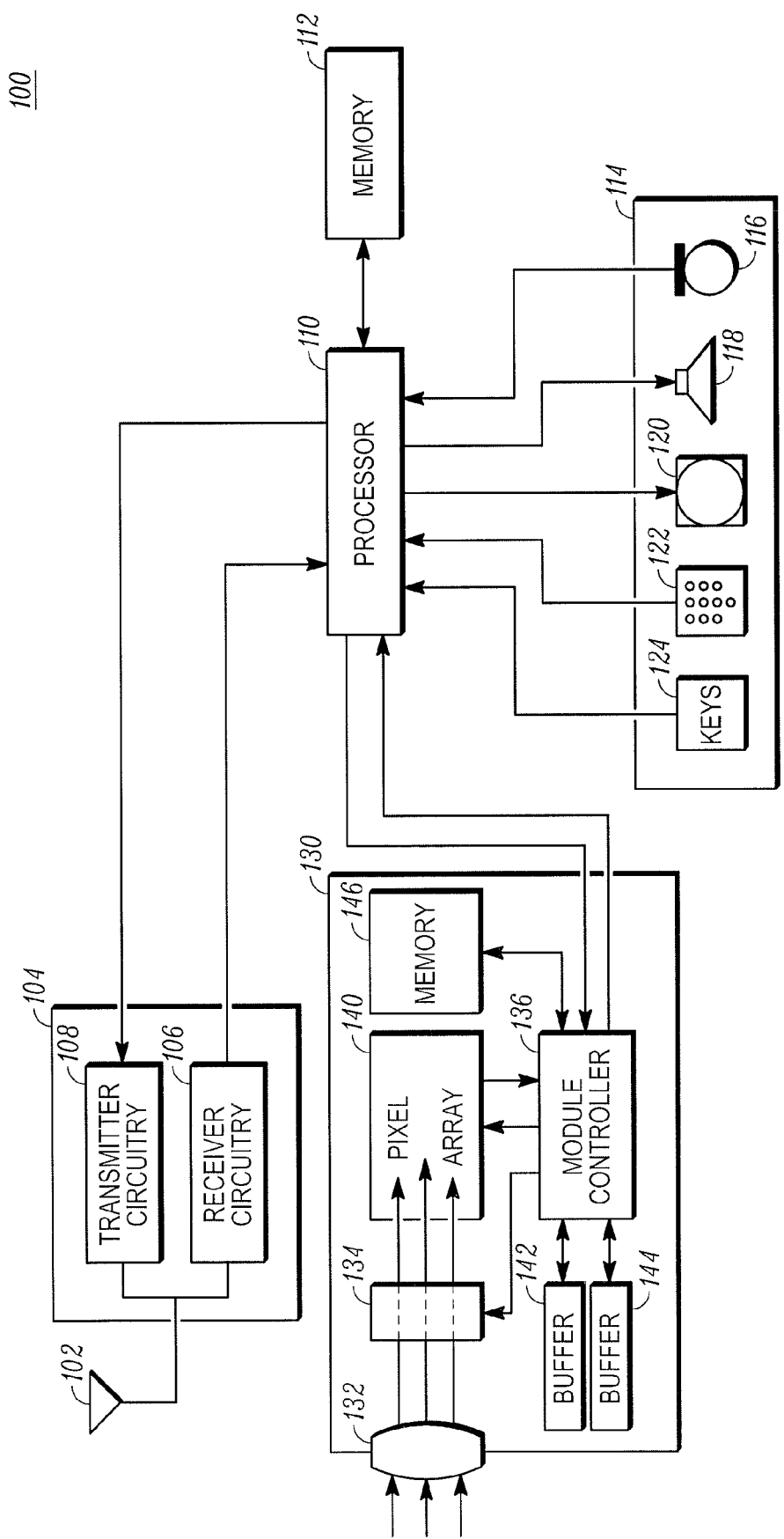
FIG. 1 depicts a mobile communication device including a digital camera module in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to digital image recording and processing. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises", "includes", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the digital camera module of a mobile communication device described herein. The non-processor circuits may include, but are not limited to, a radio frequency transceiver, clock circuits, power source circuits, and user input devices. As such, these functions may be interpreted as steps of a method to perform digital image processing in a digital camera module of the mobile communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

Accordingly, a method is provided for taking a digital picture of an image. The method includes the steps of recording a first plurality of pixel values representing the image, recording a second plurality of pixel values representing the image, and processing the first and second plurality of pixel values in a compressed domain to generate a third plurality of pixel values.

A digital camera module is also provided which includes a plurality of light sensitive pixel elements, a first memory buffer, a second memory buffer and a controller. The controller is coupled to the plurality of light sensitive pixel elements and the first and second memory buffers. The controller records a first plurality of pixel values representing an image by activating the plurality of light sensitive pixel elements in a first predetermined manner and stores the first plurality of pixel values in the first buffer and the controller then records a second plurality of pixel values representing the image by activating the plurality of light sensitive pixel elements in a second predetermined manner and stores the second plurality of pixel values in the second buffer. The controller further processes the first and second plurality of pixel values in a compressed domain to generate a third plurality of pixel values.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 depicts a mobile communication device 100 implementing a digital imager, such as a digital camera module, in accordance with an embodiment of the present invention. While the electronic device shown is a mobile communication device 100, such as a cellular telephone, the digital imager can be implemented as a standalone digital camera or can be implemented in other electronic devices.

The mobile communication device 100 includes an antenna 102 for receiving and transmitting radio frequency (RF) signals. The antenna 102 is coupled to transceiver circuitry 104 in a manner familiar to those skilled in the art. The transceiver circuitry 104 includes receiver circuitry 106 and transmitter circuitry 108. The receiver circuitry 106 demodulates and decodes received RF signals to derive information therefrom and is coupled to a processor 110 and provides the decoded information to the processor 110 for utilization by the processor 110 in accordance with the function(s) of the mobile communication device 100. The processor 110 also provides information to the transmitter circuitry 108 of the transceiver circuitry 104 for encoding and modulating the information into RF signals for transmission from the antenna 102.

As is well-known in the art, the processor 110 is coupled to a memory 112 which stores data and operational information for use by the processor 110 to perform the functions of the mobile communication device 100. The processor 110 is also coupled to conventional user interface devices 114, such as any or all of a microphone 116, a speaker 118, a display 120, a keypad 122 and/or functional key input devices 124, for receiving user inputs and/or providing information to the user of the mobile communication device 100.

In accordance with the embodiment of the present invention, the mobile communication device 100 also includes a digital camera module 130. The digital camera module includes a lens system 132 arranged to allow light into the digital camera module 130. A mechanical shutter 134 operating under the control of a digital camera module controller 136 may be included to selectively allow light focused through the lens system to pass into the digital camera module 130 to a pixel array 140. Alternatively, instead of a mechanical shutter 134, the digital camera module controller 136 can manipulate the pixel array 140 to electronically shutter it, thereby providing a shuttering method providing both reduced size of and reduced power consumption by the digital camera module 130.

Under the control of the module controller 136, the pixel array 140, receiving an image through the lens system 132, can record a digital representation of the image. When the module controller 136 signals the pixel array 140, the pixel array 140 records the image formed by the light focused by the lens system 132 thereon and stores the recorded digital information in either a first buffer 142 or a second buffer 144. The controller 136 accesses the digital information in the first and second buffers 142, 144 for additional processing before storing the digital image information in a digital camera module memory 146.

In addition to being coupled to the module controller 136 for providing digital image information thereto, the pixel array 140 is coupled to the module controller 136 for receiving operational control signals therefrom. The digital camera module controller 136 is additionally coupled to the processor 110 for receiving operational signals therefrom (such as user input signals from the user interface devices 114) and for providing image information thereto for storage in the memory 112 or for provision to the transmitter circuitry 108 for wireless transmission of the image information from the mobile communication device 100.

Figure 2B:
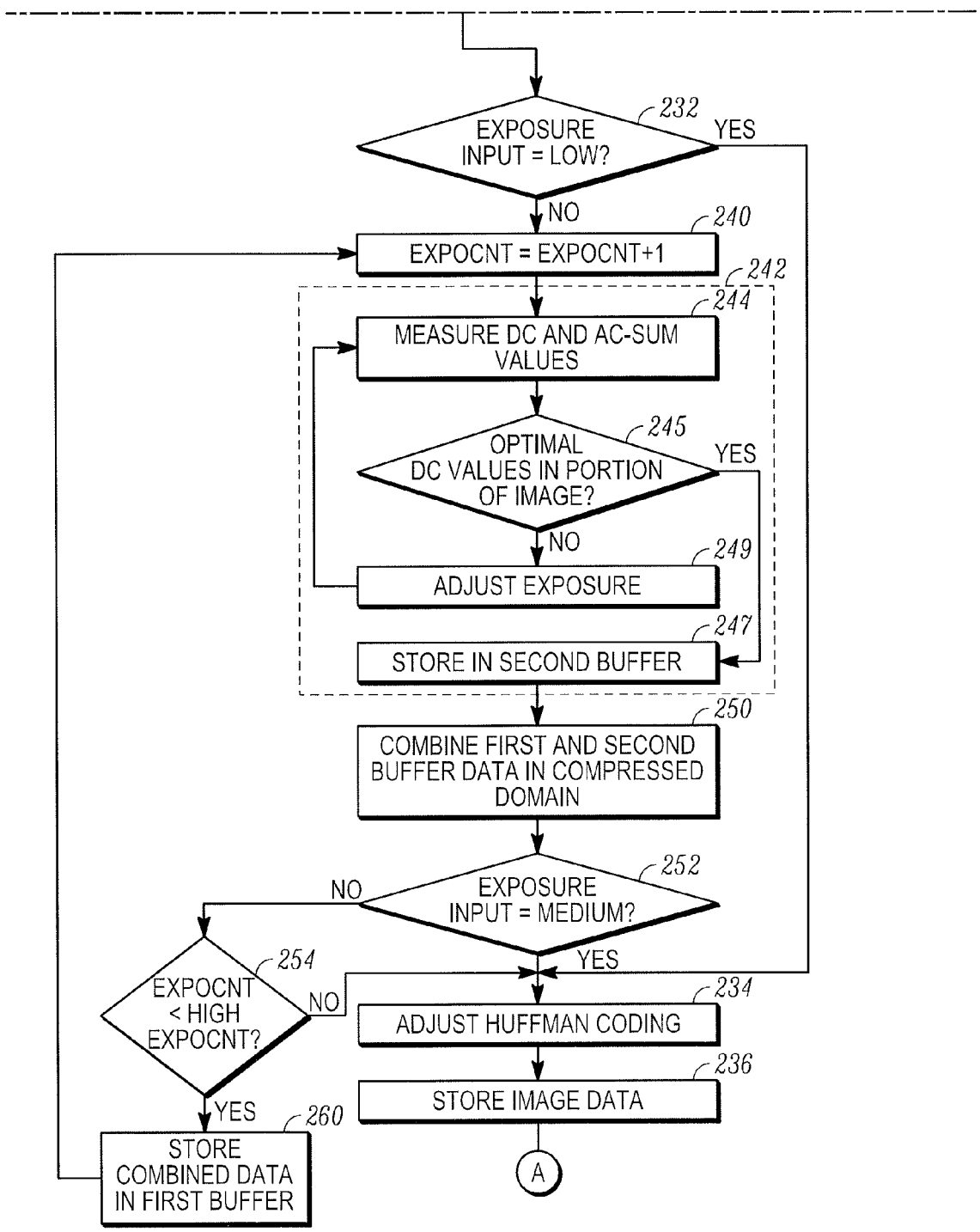
FIG. 2 is a flowchart of a digital camera module method for recording and processing digital image information in accordance with the embodiment of the present invention.

Referring to FIG. 2, a flowchart 200 of a method of the digital camera module 130 for recording and processing digital image information by the module controller 136 in accordance with the embodiment begins by determining whether the digital camera module 130 has received 202 an appropriate signal from the processor 110 (FIG. 1) to activate the module 130, such as, for example, a signal provided from the processor 110 to the controller 136 in response to a predetermined user input from the functional key input devices 124.

When the digital camera module 130 receives such activation signal 202, the components of the module are activated 204 (e.g., the controller 136 signals the shutter 134 to open) and the controller 136 determines whether operation is in a viewfinder mode 206 or whether a signal has been received from the processor 110 either to place the digital camera module 130 in an image capture mode 208 or to inactivate 210 the digital camera module 130.

During operation in the viewfinder mode 206, the controller 136 senses image information 212 from the pixel array 140, controlling the pixel array 140 to provide a low resolution image for reduction of readout time and improvement of frame rate. The controller 136 then provides 214 the sensed image information to the display 120 via the processor 110 for presentation to the user. After providing 214 the sensed image information to the processor 110, processing returns to determine whether the controller 136 will continue to operate in the viewfinder mode 206, will switch to the image capture mode 208 or will inactivate 210 the digital camera module 130.

When a signal is received by the controller 136 indicating that a picture is to be taken by the digital camera module 130, operation of the controller 136 switches to the image capture mode 208. In the image capture mode in accordance with the present embodiment, the digital camera module controller 136 initially provides the user an opportunity to select an exposure range. Thus, the module controller 136 provides appropriate signaling 216 to the processor 110 to display a choice of exposure ranges to the user on the display 120. In accordance with the present embodiment, three choices are provided: a HIGH exposure level, a MEDIUM exposure level and a LOW exposure level.

After displaying the exposure ranges 216, the module controller 136 determines whether an exposure range input has been received 218. If no exposure range input has been received 218 within a predefined timeout period 219, a MEDIUM exposure level is assigned 220 as the exposure level. When an exposure range input has been received 218 within the predefined timeout period, the exposure level is assigned 221 in accordance with exposure range input received 218.

Processing then awaits a user input to initiate recording image information 222, such as a shutter button signal from the processor 110 indicating that the user had pressed one of the functional key input devices 124 that is predefined as a shutter button. If the shutter button signal is not received 222 within a predefined timeout period 223, processing returns to determine whether the controller 136 will continue to operate in the viewfinder mode 206, will switch to the image capture mode 208 or will inactivate 210 the digital camera module 130. When the shutter button signal is received 222, an exposure counter, EXPOCNT, is set to one 224 and, in accordance with the present embodiment, a first image is captured 225.

The first image is captured 225 by measuring compressed pixel values viewed through the lens system 132 in accordance with a predetermined light condition 226. The predetermined exposure length for the first image capture is chosen to accommodate light conditions in the bright center of the image. In accordance with the present embodiment, the pixel values are measured in the compressed domain as JPEG compressed pixel values having a DC value and an AC-sum value as calculated by the JPEG compression algorithms which include a discrete cosine transformation and a run length function. The module controller 136 records 226 the DC and AC-sum values of each pixel in order to measure the pixel values in the compressed domain.

The module controller 136 then determines 227 whether the DC values of the pixels within a center portion of the image are within an optimal range of DC values. If the DC values are higher than the optimal DC values, the center of the image is overexposed, and if the DC values are lower than the optimal DC values, the center of the image is underexposed. When the DC values of the pixels within the center portion of the image are within the optimal range of DC values 227, the compressed pixel values (i.e., the DC and AC-sum values) are stored 228 in the first buffer 142.

If the DC values of the pixels within the center portion of the image are outside the optimal range of DC values 227, the controller 136 adjusts an exposure level 230 based upon the light condition for the center portion of the image and returns to step 226 to re-measure the compressed pixel values of the image by mechanically or electronically shuttering the pixel array 140 in accordance with the exposure level set at step 230 to generate exposure-adjusted compressed image information. When the DC values of the exposure-adjusted compressed image information of the center portion of the image is within the optimal DC value range 227, the compressed image information is stored 228 in the first buffer 142.

Processing next determines 232 whether a LOW exposure level had been assigned at step 221. If the LOW exposure level had been assigned 232 (i.e., the user had chosen to record the image within a low exposure range), a single recorded image is utilized to generate image information. Generation of a compressed image is then completed by applying Huffman coding 234 to the compressed image data file stored in the first buffer 142 to generate compressed image information. The compressed image information is stored 236 by the controller 136 in the module memory 146 and/or forwarded to the controller 110 for storage in the memory 112. Processing then returns to determine whether the controller 136 will continue to operate in the viewfinder mode 206, will switch to the image capture mode 208 or will inactivate 210 the digital camera module 130.

If the LOW exposure level had not been assigned 232 (i.e., the user had chosen to record the image within a medium or high exposure range), multiple recorded images are utilized to generate the image information. Therefore, if the LOW exposure level had not been assigned 232, the exposure counter, EXPOCNT, is incremented by one 240 and an additional image is captured 242.

The next image is captured 242 by measuring compressed pixel values viewed through the lens system 132 for a predetermined exposure length 244. The predetermined exposure length for the second image capture is chosen to maximize the dynamic range of the image. As before, in accordance with the present embodiment, the pixel values are measured in the compressed domain as JPEG compressed pixel values having a DC value and an AC-sum value, and the module controller 136 records 244 the DC and AC-sum values of the pixels. The module controller 136 then determines 245 whether the DC values of the pixels within a portion of the image other than the center portion are within the optimal range of DC values. When the DC values of the pixels within the center portion of the image are within the optimal range of DC values 245, the compressed pixel values (i.e., the DC and AC-sum values) are stored 247 in the second buffer 144.

If the DC values of the pixels within the portion of the image are outside the optimal range of DC values 245, the controller 136 adjusts an exposure level 249 based upon the light condition for that portion of the image and returns to step 244 to re-measure the compressed pixel values of the image by mechanically or electronically shuttering the pixel array 140 in accordance with the exposure level set at step 249 to generate exposure-adjusted compressed image information. When the DC values of the exposure-adjusted compressed image information of the portion of the image are within the optimal DC value range 245, the compressed image information is stored 247 in the second buffer 144.

Figure 4:
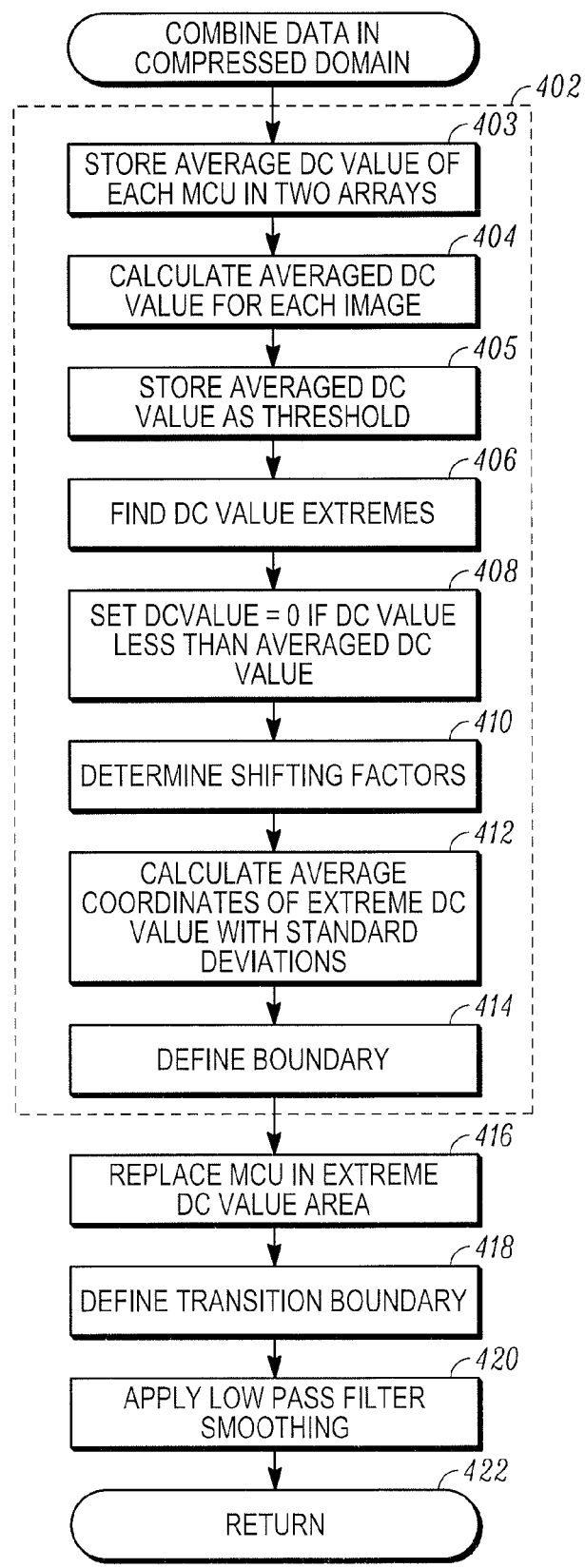
FIG. 4 is a flowchart of a method for combining and processing compressed digital image information in accordance with the embodiment of the present invention.

After the additional image is captured 242, the module controller 136 retrieves the first compressed image data file representing a first plurality of pixel values from the first buffer 142 and the second compressed image data file representing a second plurality of pixel values from the second buffer and processes the compressed information in the compressed domain 250, such as combining the JPEG compressed information at an intermediate step within the JPEG compression algorithms before the final JPEG compressed image (i.e., combining the DC values and AC sum values) to generate a third compressed image data file representing a third plurality of pixel values. FIG. 4 below provides a more detailed discussion of a method for combining the pixel values in the compressed domain 250 in accordance with the present embodiment.

Processing next determines 252 whether a MEDIUM exposure level had been assigned at step 221. If the MEDIUM exposure level had been assigned 252 (i.e., the user had chosen to record the image within a medium exposure range), in accordance with the present embodiment, two recorded images are utilized to generate the image information. Therefore, after combining the compressed images in the compressed domain to generate the third compressed image data file 250, generation of the compressed image is completed by applying Huffman coding 234 to the third compressed image data file to generate compressed image information. The compressed image information is then stored 236 by the controller 136 in the module memory 146 and/or forwarded to the controller 110 for storage in the memory 112. Processing then returns to determine whether the controller 136 will continue to operate in the viewfinder mode 206, will switch to the image capture mode 208 or will inactivate 210 the digital camera module 130.

If the LOW exposure level had not been assigned 232 and the MEDIUM exposure level had not been assigned 252, the user had chosen to record the image within a high exposure range. In accordance with the present embodiment, the HIGH exposure level requires more than two image captures. A predetermined number of image captures are set by the module controller 136 as the HIGH level exposure count, HIGHEXPOCNT. If the MEDIUM exposure level had not been assigned 252, and the exposure counter, EXPOCNT, is less than the HIGH level exposure count, HIGHEXPOCNT, 254, the third compressed image data file is stored 260 in the first buffer 142 and processing proceeds to step 240 where the exposure counter, EXPOCNT, is incremented by one and another image is captured 242.

When the exposure counter, EXPOCNT, is greater than or equal to the HIGH level exposure count, HIGHEXPOCNT, 254, the number of image captures for a high exposure range image have been taken and processing proceeds to step 234 for completion of the compressed image. Generation of the compressed image is completed by applying Huffman coding 234 to the combined compressed image data file to generate compressed image information. The compressed image information is then stored 236 by the controller 136 in the module memory 146 and/or forwarded to the controller 110 for storage in the memory 112. Processing then returns to determine whether the controller 136 will continue to operate in the viewfinder mode 206, will switch to the image capture mode 208 or will inactivate 210 the digital camera module 130.

When a signal is received to inactivate 210 the digital camera module 130, the controller inactivates 270 the components of the digital camera module 130 and processing by the controller 136 returns to await a subsequent signal to activate 202 the module 130.

While the description hereinabove of the processing of the digital camera module controller 136 in accordance with the present embodiment assigns a single image capture to the LOW exposure level, two image captures to the MEDIUM exposure level and more than two image captures to the HIGH exposure level, the number of image captures assigned to each exposure level as well as the number of exposure levels are exemplary and those skilled in the art will realize various implementations without departing from the scope of the invention.

Figure 3:
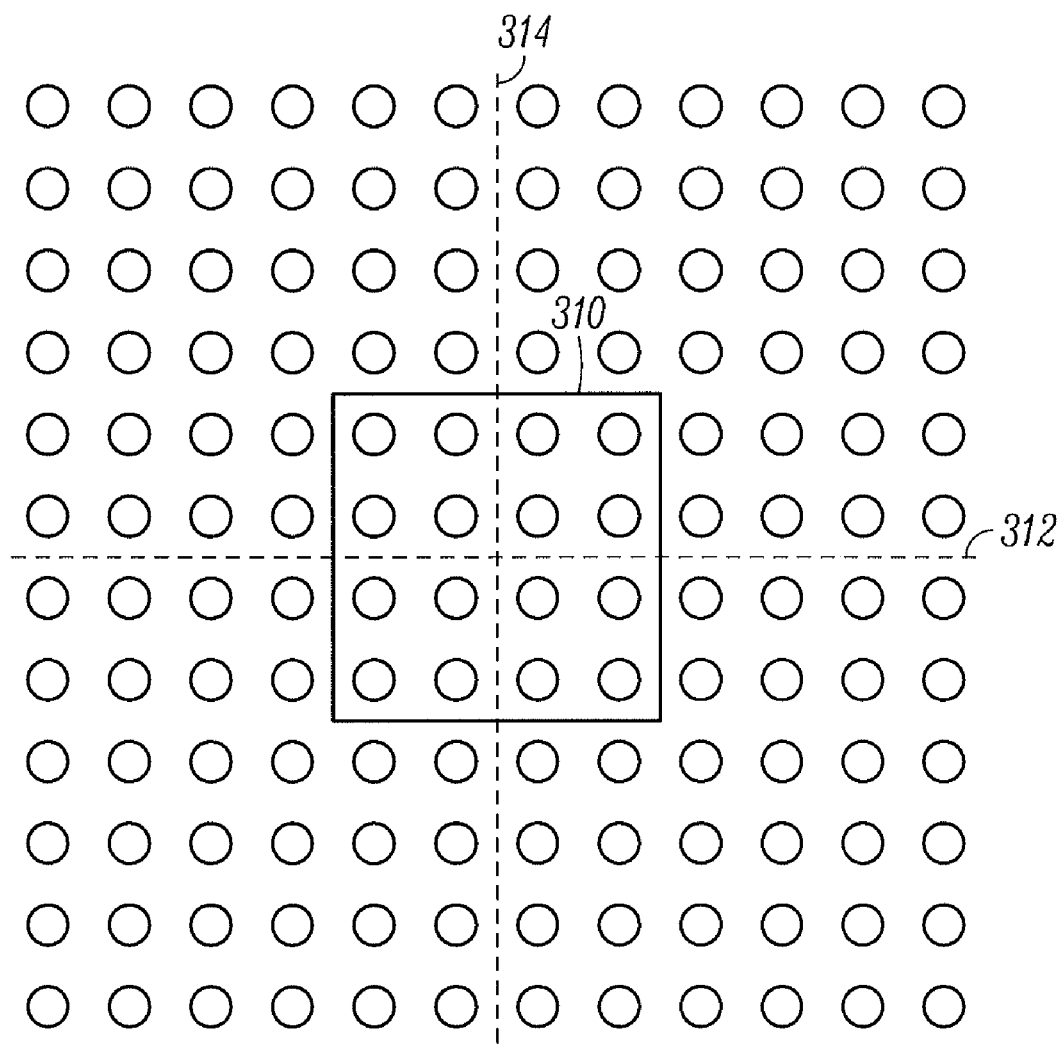
FIG. 3 is a diagram of a pixel array of the digital camera module of FIG. 1 in accordance with the embodiment of the present invention.

Referring to FIG. 3, a diagram of a pixel array 140 of the digital camera module 130 in accordance with the embodiment is depicted. While the depicted pixel array is a twelve by twelve pixel array, this size is adapted for illustration. A pixel array 140 in a digital camera module 130 typically includes approximately three million pixels. For color image capture, three pixel values are recorded at each pixel location and combined in a manner well-known to those skilled in the art to create a single color pixel. Thus, the pixel array 140 depicted in FIG. 3 is a simplified view to illustrate aspects of the present embodiment and is not intended to represent a pixel array 140 for use in accordance with the present embodiment.

The pixel array 140 includes a center portion 310. Therefore, at step 226, the light condition for a center portion of the image corresponding to the center portion 310 of the pixel array 140 is measured. In a manner well-known to those skilled in the art, the light condition for this center portion 310 of the image can be measured by activation of the pixels within the center portion 310 of the pixel array 140. Typically, the image viewed through the small lens system 132 of a digital camera module 130 of a wireless communication device 100 has a bright center and darker, vignetted corners. Thus, a light condition of the center portion 310 is typically a bright light condition. Accordingly, the exposure level set at step 227 is typically a short exposure time to accommodate the high light condition of the center portion 310 of the pixel array 140.

In accordance with the present embodiment, LOW exposure level image capture will involve a single image capture utilizing an exposure determined in response to the light condition measured by the pixels within the center portion 310 of the pixel array 140. MEDIUM exposure level image capture, however, will involve two image captures, wherein the first image capture utilizes an exposure determined in response to the light condition measured by the pixels within the center portion 310 of the pixel array 140 and the second image capture utilizes an exposure determined in response to the light condition measured by the pixels outside the center portion 310 of the pixel array 140. As typical images viewed through the lens system 132 have vignetted, dark corners, a light condition of the pixels outside the center portion 310 as measured at step 244 for MEDIUM exposure level image capture is typically a low light condition. Accordingly, the exposure level set at step 245 is typically a long exposure time to accommodate the low light condition of the pixels outside the center portion 310 of the pixel array 140.

As those skilled in the art will realize, increasing the number of image captures where each image capture is exposed in accordance with a light condition measured in a portion of the image, increases the quality of the resultant image as the portions of the image optimally exposed in accordance with their light conditions are combined in accordance with the present embodiment. Thus, the bright center and vignetted corners of the image information captured by the camera module 130 can be adjusted through robust processing in accordance with the present embodiment to provide a better quality image. Assignment of a short exposure time as the exposure level when a bright light condition is measured in, for example, the bright center portion 310 reduces motion blur in the center of the image and reduces pixel saturation throughout the pixel array 140. When a low light condition is measured in, for example, the corners, a longer exposure time is assigned as the exposure level thereby improving signal to noise ratios at the pixels in the corners and reducing picture graininess.

The quality of the image can be further increased by increasing the number of image captures tailored to the light conditions at various portions of the image. For HIGH exposure level capture, the number of image captures is greater than two and predetermined in accordance with various parameters of the digital camera module 130, such as the computational speed of the module controller 136, the size of the pixel array 140, and the size and read/write speed of the memory elements such as the first and second buffers 142, 144 and the memory 146.

For example, for HIGH exposure level capture where the number of image captures is defined as three, the first image capture would utilize an exposure determined in response to the light condition measured by the pixels within the center portion 310 of the pixel array 140 and the second and third image captures could utilize exposures determined in response to the light condition measured by the pixels outside the center portion 310 and above and below the vertical midpoint line 312, respectively. Alternatively, the second and third image captures could utilize exposures determined in response to the light condition measured by the pixels outside the center portion 310 and to the left of and to the right of the horizontal midpoint line 314, respectively.

As a further example, if the number of image captures for HIGH exposure level capture is defined as five, the first image capture could utilize an exposure determined in response to the light condition measured by the pixels within the center portion 310 of the pixel array 140 and the second, third, fourth and fifth image captures could utilize exposures determined in response to the light condition measured by the pixels outside the center portion 310 and within the upper right quadrant, upper left quadrant, lower right quadrant and lower left quadrant, respectively, where the quadrants are defined by the vertical midpoint line 312 and the horizontal midpoint line 314. While the midpoint lines 312 and 314 have been used for defining non-center light condition measuring areas, those skilled in the art will realize various additional non-center light condition measuring area methodologies. In accordance with the present invention, the non-center light condition measuring areas of the pixel array 140 should be defined to provide a robust, high quality image capture mode accommodating the image information as viewed through the lens system 132 of the digital camera module 130. In addition, while the image capture parameters for LOW, MEDIUM and HIGH exposure levels are factory set in accordance with the present embodiment, it is contemplated that some or all of these parameters (e.g., definition of the number of image captures at each exposure level) could be provided as user selectable options for a digital camera module 130.

Referring to FIG. 4, a flowchart of a method for combining and processing compressed digital image information 250 in accordance with the embodiment of the present invention wherein multiple compressed image data files are combined in the compressed domain. While compression in accordance with JPEG compression techniques developed by the Joint Photographic Experts Committee and well-known to those skilled in the art is described herein, it is contemplated that any photographic compression technique such as TIFF, GIF or JPEG 2000 may be used in accordance with the present embodiment. The memory and processing savings described herein are calculated utilizing JPEG compression techniques.

Since JPEG compression techniques involve converting image information to a frequency space using discrete cosine transformations, the JPEG compressed domain for combining the multiple compressed image data files can also be referred to as the frequency domain. In accordance with the present embodiment as described hereinbelow, the compressed image data files are combined and processed in the compressed or frequency domain, thereby advantageously providing up to an eighty percent reduction in memory and processing requirements over conventional spatial manipulation techniques. Reduction in memory requirements provides cost reduction benefits for digital camera modules 130 in accordance with the present embodiment. In addition, simplified processing requirements reduces the MIPS (Microprocessor without Interlocked Pipeline Stages) requirements for the module controller 136, thereby providing further cost reduction benefits for digital camera modules 130 in accordance with the present embodiment.

Prior to combining the compressed image data files 250, they are each stored in the buffers 142, 144. In accordance with JPEG compression techniques, the compressed image data files have been generated by performing discrete cosine transformations on the plurality of pixel values recorded during the image capture and generating an eight by eight matrix having one direct current (DC) coefficient and sixty-three alternating current (AC) coefficients for each minimum coded unit (MCU) of the plurality of pixel values. The AC components are basically the amplitudes for the frequency components in the image. A MCU can be a single pixel or an array of pixels of a predetermined size. In accordance with the present embodiment, a MCU is an eight pixel by eight pixel portion of the pixel array 140.

The method for combining and processing compressed digital image information 250 in accordance with the present embodiment initially defines a boundary of the optimized portions of the images represented by the two compressed image data files 402. First, an average DC coefficient value for each individual MCU of each image in the two compressed image data files is stored 403. Next, the average DC coefficient value for each compressed image data file is calculated 404 and stored 405. Extreme DC threshold references are then determined 406 by comparing the average DC coefficient value for each MCU for each compressed image data file with the average DC coefficient value for that compressed image data file. The DC coefficient value is then set to zero if it is less than the average DC coefficient value for that compressed image data file 408. Shifting factors are determined by aligning the extreme DC coefficients of the two images 410 and the average coordinates of the DC coefficients in the second image (i.e., the compressed image data file stored in buffer 144) are calculated 412 with standard deviations in four directions. A boundary is then defined based on the standard deviations for the area with the extreme DC coefficients 414.

After the boundary is defined 402, the MCUs of the second compressed image data file within the boundary (i.e., in the area with the extreme DC coefficients) are replaced by the MCUs of the first compressed image data file within the boundary 416. A smooth transition boundary is then defined around the area with the extreme DC coefficients using the average DC values for the first compressed image data file 418 and the transition boundary is further smoothed by applying filtering techniques such as a low pass filter or a bandpass filter on the transition boundary 420.

While previous filtering techniques have utilized low pass filtering using wavelength measured combinations and other spatial manipulated methods, an exemplary low pass filter smoothing in accordance with the present embodiment utilizes a Fourier expansion method and is carried out in the compressed domain. One implementation for performing the low pass filter smoothing in the compressed domain in accordance with the present embodiment utilizes an image function as set out in Equation 1 and a linear function as set out in Equation 2, where the boundary conditions are defined in Equations 3 and 4.

$$I(x,y) \quad [1]$$

$$f(x)=ex+d \quad [2]$$

$$I(x_l,y)f(x_l)=I_0 \quad [3]$$

$$I(x_h,y)f(x_h)=I_1 \quad [4]$$

Utilizing these boundary conditions advantageously allows the coefficients "e" and "d" to be estimated using the DC value of the adjacent MCU without necessitating execution of any inverse discrete cosine transformations, thereby simplifying the processing requirements. After estimating the coefficients "e" and "d", the function f(x) is remapped in the zig-zag format f(z), thereby converting the image function of Equation 1 to I(z).

Applying low pass filtering to an MCU is equivalent to multiplying f(z) with I(z) as shown in Equation 5.

$$I'(z)=f(z)I(z) \quad [5]$$

Since both f(z) and I(z) can be represented as a series of cosine transformations, Equation 5 can be written as shown below in Equation 6, where $a_i$ and $b_i$ are discrete cosine transformation coefficients determined by I(z) and f(z).

$$I'(z)=\Sigma a_i \cos[(2i+1)\pi z/128]\Sigma b_i \cos[(2i+1)\pi z/128] \quad [6]$$

Equation 7 is derived by expanding the discrete cosine transform series of Equation 6.

$$I'(z)=\Sigma(a_0 b_i + a_i b_0)\cos[(2i+1)\pi z/128]+\text{higher order terms} \quad [7]$$

Thus, a first order approximation of the zig-zagged image function I'(z) as set out in Equation 8, provides a low pass filtering method for smoothing the transition boundary 420 that can be performed in the compressed domain and requires reduced processing requirements over smoothing algorithms in the spatial domain, such as prior art wavelength measured combinations.

$$\Gamma(z)=\Sigma(a_0 b_i + a_i b_0)\cos[(2i+1)\pi z/128] \quad [8]$$

After smoothing the transition boundary 420, combination of the compressed image data files is complete and processing returns 422 to step 252 (FIG. 2). By combining the images represented by the plurality of pixel values in the compressed space, not only can processing requirements be simplified and reduced as shown above, but substantial memory savings can be maintained for the image data files. For example, a typical pixel array 140 includes approximately three million pixels. With three color pixel values for each pixel, approximately nine Megabytes of memory is required to store one image, eighteen Megabytes of memory to store two images. Therefore, at least eighteen Megabytes of memory is required to manipulate the plurality of pixel values in the space domain. Manipulating two images stored in compressed data files, on the other hand, requires only about 3.6 Megabytes of storage capacity, thereby realizing an approximately five-to-one reduction in memory requirements for the digital camera module 130 in accordance with the present embodiment.

Thus it can be seen that a method and apparatus have been disclosed which advantageously provides robust digital image processing which smooths out image information to reduce the bright centers and lighten the vignetted corners of digital images. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for taking a digital picture of an image, the method comprising the steps of:
    recording a first plurality of pixel values representing the image;
    recording a second plurality of pixel values representing the image; and
    processing the first and second plurality of pixel values in a compressed domain to generate a third plurality of pixel values by:
        determining a center image boundary in response to the first and second plurality of pixel values, and
        generating the third plurality of pixel values in the compressed domain in response to the first plurality of pixel values, the second plurality of pixel values and the center image boundary, wherein the step of generating the third plurality of pixel values comprises the steps of:
            replacing ones of the second pixel values within the center image boundary with ones of the first pixel values within the center image boundary, and
            defining a smooth transition boundary in the compressed domain which includes the center image boundary.

2. The method in accordance with claim 1 wherein the step of defining the smooth transition boundary in the compressed domain comprises the step of defining the smooth transition boundary in accordance with a filtering technique, the smooth transition boundary including the center image boundary.

3. The method in accordance with claim 2 wherein the step of defining the smooth transition boundary in accordance with a filtering technique comprises the step of defining the smooth transition boundary in accordance with a filtering technique selected from the group of filtering techniques comprising bandpass filtering, low pass filtering, and low pass filtering utilizing a Fourier expansion method.

4. The method in accordance with claim 1 wherein the step of determining a center image boundary comprises the step of determining the center image boundary by cosine transformation of the first and second plurality of pixel values.

5. The method in accordance with claim 1 further comprising the step of applying Huffman coding to the third plurality of pixel values.

6. The method in accordance with claim 1 wherein the step of recording the first plurality of pixel values comprises the step of recording compressed image data for the first plurality of pixel values to generate a first compressed image data file, and wherein the step of recording the second plurality of pixel values comprises the step of recording compressed image data for the second plurality of pixel values to generate a second compressed image data file, and wherein the step of processing the first and second plurality of pixel values in a compressed domain to generate the third plurality of pixel values comprises the step of processing the first and second compressed image data files to generate a third compressed image data file.

7. A method for taking a digital picture of an image, the method comprising the steps of:
    recording a first plurality of pixel values representing the image by recording compressed image data for the first plurality of pixel values in accordance with a JPEG compression algorithm by measuring DC values and AC-sum values to generate a first compressed image data file;
    recording a second plurality of pixel values representing the image by recording compressed image data for the second plurality of pixel values in accordance with the JPEG compression algorithm by measuring DC values and AC-sum values to generate a second compressed image data file; and
    processing the first and second plurality of pixel values in a compressed domain to generate a third plurality of pixel values by processing the first and second compressed image data files at an intermediate step within the JPEG compression algorithms to generate a third compressed image data file.

* * * * *